(12) United States Patent
Barrell et al.

(10) Patent No.: US 11,055,001 B2
(45) Date of Patent: Jul. 6, 2021

(54) LOCALIZED DATA BLOCK DESTAGING

(71) Applicant: Seagate Technology LLC, Cupertino, CA (US)

(72) Inventors: Michael David Barrell, Longmont, CO (US); Zachary David Traut, Denver, CO (US)

(73) Assignee: Seagate Technology LLC, Fremont, CA (US)

( * ) Notice: Subject to any disclaimer, the term of this patent is extended or adjusted under 35 U.S.C. 154(b) by 314 days.

(21) Appl. No.: 15/992,271

(22) Filed: May 30, 2018

(65) Prior Publication Data
US 2019/0369874 A1 Dec. 5, 2019

(51) Int. Cl.
*G06F 3/06* (2006.01)
*G06F 16/903* (2019.01)

(52) U.S. Cl.
CPC .............. *G06F 3/064* (2013.01); *G06F 3/061* (2013.01); *G06F 16/903* (2019.01); *G06F 3/0671* (2013.01)

(58) Field of Classification Search
CPC ........ G06F 3/061; G06F 3/064; G06F 3/0671; G06F 16/903
USPC ......................................................... 711/100
See application file for complete search history.

(56) References Cited

U.S. PATENT DOCUMENTS

| | | | |
|---|---|---|---|
| 5,542,066 A | 7/1996 | Mattson et al. | |
| 6,192,450 B1 | 2/2001 | Bauman et al. | |
| 6,425,050 B1 | 7/2002 | Beardsley et al. | |
| 6,567,888 B2 | 5/2003 | Kedem | |
| 8,788,742 B2 | 7/2014 | Benhase et al. | |
| 8,793,441 B2 | 7/2014 | Factor et al. | |
| 8,819,343 B2 | 8/2014 | Benhase et al. | |
| 8,825,952 B2 | 9/2014 | Benhase et al. | |
| 8,838,905 B2 | 9/2014 | Benhase et al. | |
| 8,886,880 B2 | 11/2014 | Barrell et al. | |
| 8,930,619 B2 | 1/2015 | Barrell et al. | |
| 8,996,789 B2 | 3/2015 | Benhase et al. | |
| 9,087,006 B2 | 7/2015 | Yochai et al. | |
| 9,715,519 B2 | 7/2017 | Atkisson | |
| 9,959,052 B1* | 5/2018 | Xu | G06F 3/061 |
| 2013/0326149 A1 | 12/2013 | Barrell et al. | |

FOREIGN PATENT DOCUMENTS

EP    2988222 A1    2/2016
WO    2008074830 A2    6/2008

* cited by examiner

*Primary Examiner* — Hua J Song
(74) *Attorney, Agent, or Firm* — Kagan Binder, PLLC

(57) ABSTRACT

A system includes a memory and a processor coupled to the memory, where the processor is configured to perform various operations. The operations include receiving, in response to a first read input/output operation, a first location of a first data block. The operations also include executing the first read input/output operation at the first data block at the first location. The operations also include selecting a second location within a first search range for destaging a second data block based at least in part on the first location. The operations also include destaging the second data block at the second location upon a determination that a second read input/output operation is not currently executing or queued for execution.

20 Claims, 13 Drawing Sheets

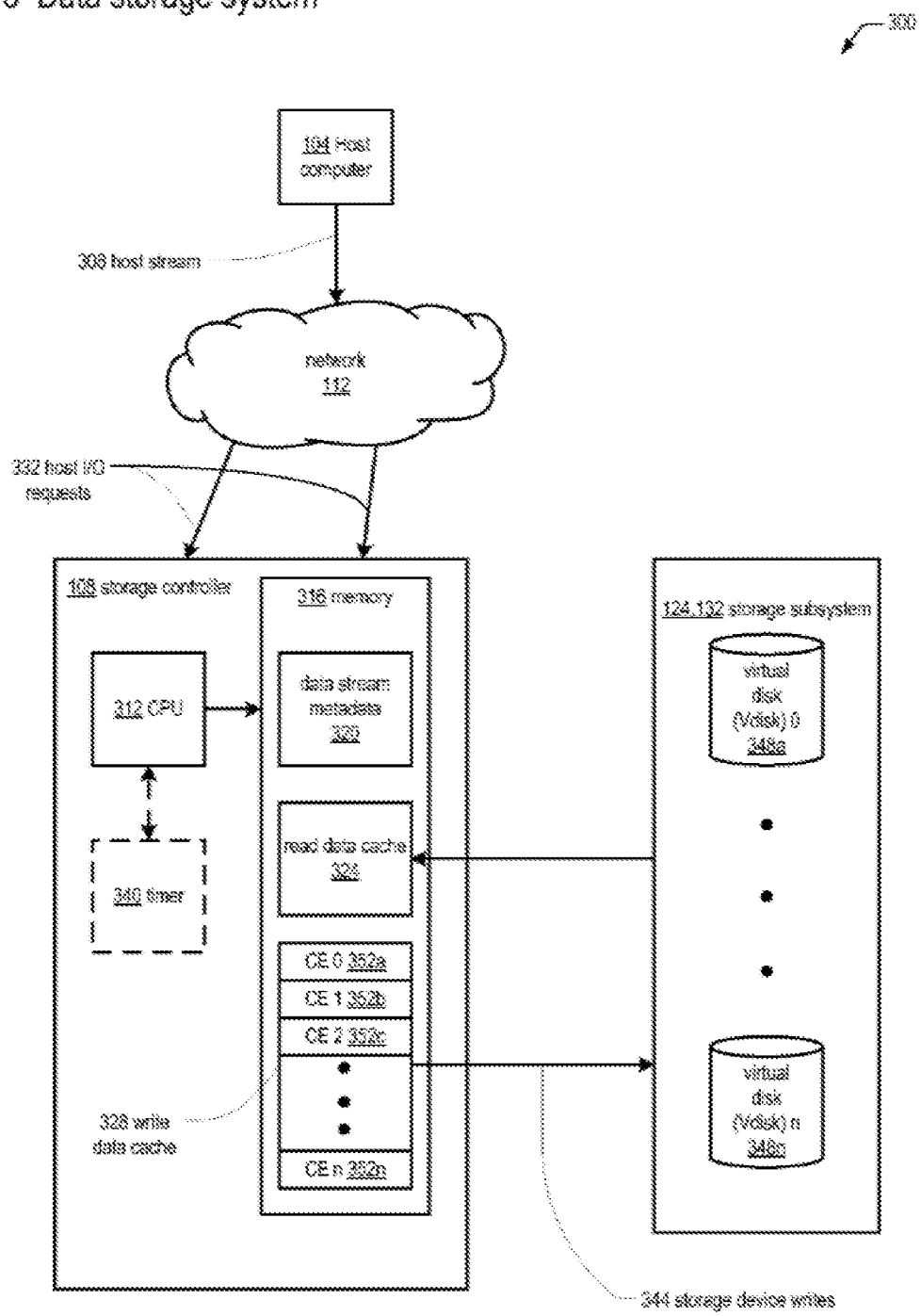
Fig. 3 Data storage system

FIG. 4A  Single storage device striped volume
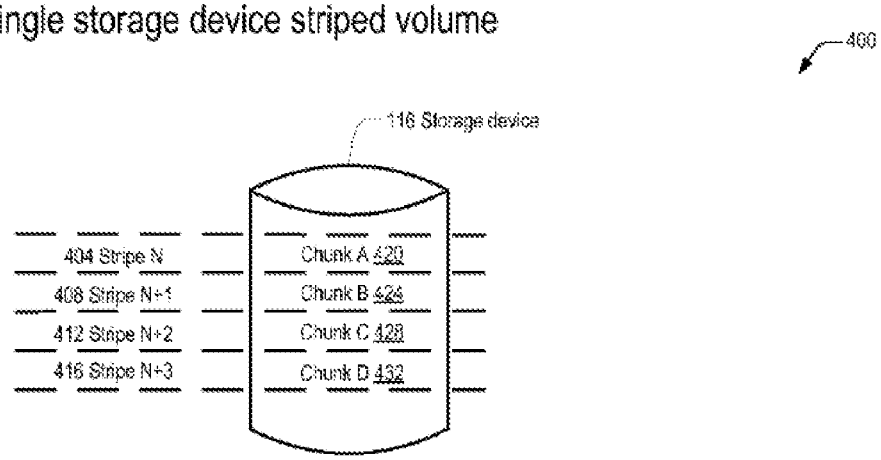
FIG. 4B  Multiple storage device striped volume
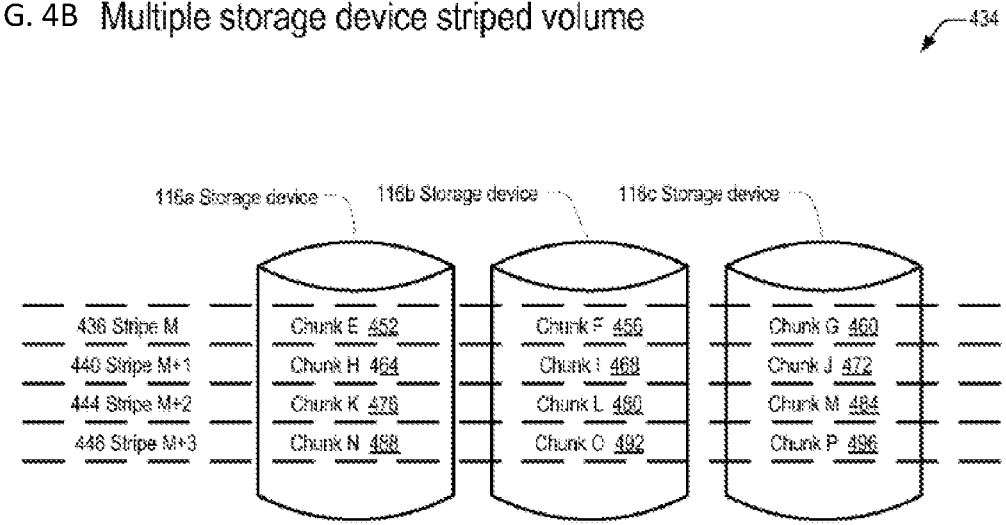

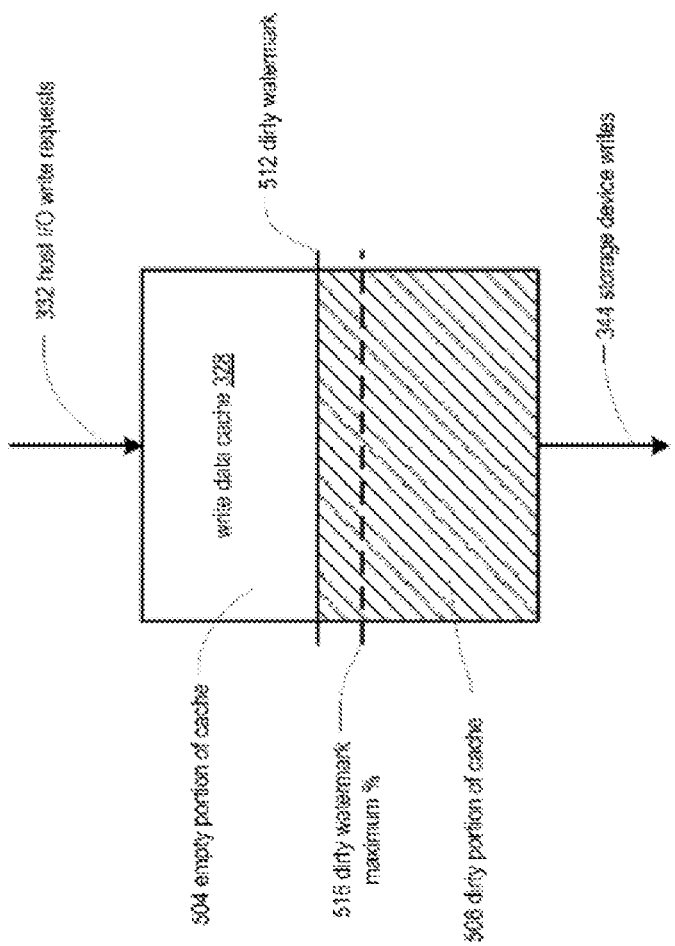
Fig. 5 Write data cache data flow

LOCALIZED DATA BLOCK DESTAGING

BACKGROUND

The present disclosure is directed to computer data storage systems. In particular, the present disclosure is directed to methods and apparatuses for efficiently destaging sequential write data from a storage controller cache memory to storage devices of a striped volume.

In data storage systems, write performance is increased by utilizing well known data caching techniques, including write-back caching. Write-back caching can free up a host computer to issue additional read or write requests. If write cache space is not available, the storage controller instead transfers the write request directly to the slower storage devices, thus degrading write performance. The storage controller institutes various policies to determine when, which, and how much write data to transfer to destination storage devices (e.g., back-end disks). The actions surrounding this transfer are referred to as destaging data from the write cache.

SUMMARY

Advantages of the present disclosure include improvements to write performance to a striped virtual disk by efficiently destaging write data from a storage controller write cache.

According to a first aspect of the present disclosure, a system is disclosed. According to the first aspect, the system includes a memory and a processor coupled to the memory, where the processor is configured to perform various operations. The operations include receiving, in response to a first read input/output operation, a first location of a first data block. The operations also include executing the first read input/output operation at the first data block at the first location. The operations also include selecting a second location within a first search range for destaging a second data block based at least in part on the first location. The operations also include destaging the second data block at the second location upon a determination that a second read input/output operation is not currently executing or queued for execution.

According to a second aspect of the present disclosure, a method is disclosed. According to the second aspect, the method include receiving, in response to a first read input/output operation, a first location of a first data block. The method also includes executing the first read input/output operation at the first data block at the first location. The method also include selecting a second location within a first search range for destaging a second data block based at least in part on the first location. The method also includes destaging the second data block at the second location upon a determination that a second read input/output operation is not currently executing or queued for execution.

According to a third aspect of the present disclosure, a computer program product for performing localized destages is disclosed. According to the third aspect, the computer program product is configured for performing localized destages. The computer program product includes a computer-readable storage medium having program code embodied therewith, and the program code comprising computer-readable program code configured to perform a method. The method includes receiving, in response to a first read input/output operation, a first disk location of a first data block. The method also includes executing the first read input/output operation at the first data block at the first disk location. The method also includes selecting a second disk location within a first search range for destaging a second data block based at least in part on the first disk location. The method also includes destaging the second data block at the second disk location upon a determination that a second read input/output operation is not currently executing or queued for execution.

These and various other features and advantages will be apparent from a reading of the following detailed description.

BRIEF DESCRIPTION OF THE DRAWINGS

The present disclosure will be further explained with reference to the appended Figures, wherein like structure is referred to by like numerals throughout the several views, and wherein:

FIG. 3 is a block diagram illustrating a data storage system, in accordance with embodiments of the present disclosure.

FIG. 4A is a block diagram illustrating components of a single storage device striped volume in accordance with embodiments of the present disclosure.

FIG. 4B is a block diagram illustrating components of a multiple storage device striped volume in accordance with embodiments of the present disclosure.

FIG. 5 is a block diagram illustrating a write data cache data flow in accordance with embodiments of the present disclosure.

DETAILED DESCRIPTION

Figure 1A:
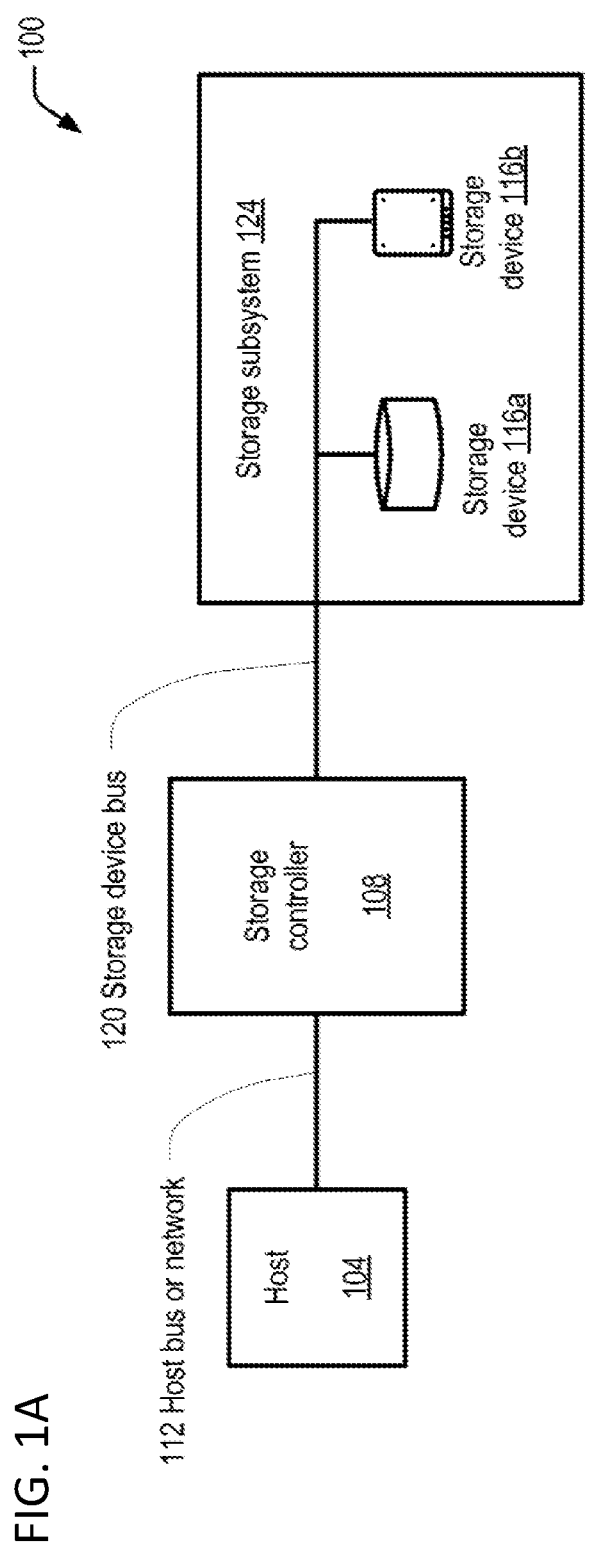
FIG. 1A is a block diagram illustrating components of a first non host-based data storage system in accordance with embodiments of the present disclosure.

Storage controller write caches may be difficult to manage efficiently. For cache writes, where data is written to one or more back-end storage device, such as a hard-disk drive (HDD), solid-state drive (SSD), or any other suitable storage device, the general rule is that the more sequential destages are, the better the resulting cache performance due to reduced storage device seek time between writes. Destaging data generally occurs asynchronously, or at various defined times based on other factors. Destaging write data is important as it frees up write cache space to accept new write requests from host computers, and the data is stored on storage devices in redundant array of independent disk (RAID) configurations. Redundant, RAID configurations preserve data in the event of a single storage device failure—and in some RAID configurations—multiple storage device failures. It is therefore desirable to efficiently destage write data from a storage controller write cache to storage devices.

Without an efficient means to destage stripes to a striped volume, one of two outcomes are likely. Either, a storage controller may over-aggressively copy write data from the write cache to the striped volume, resulting in under-utilization of the write cache and little benefit to write caching in general. Or, a storage controller may under-aggressively copy write data from the write cache to the striped volume, resulting in a generally full write cache. When the write cache is full, the storage controller must either delay new writes until space is available in the write cache, or else handle new writes in a write-through mode directly to storage devices. Both results reduce performance.

However, one common problem occurs when both read and write operations are attempted at the same time at the same cache block, which can lead to a cache miss and a corresponding read from the back-end storage device. Such reads from disk are not efficiently coordinated with the destaging process, causing the writes to back-end storage device to occur more randomly, affecting and slowing storage device performance. In cases where a cache miss does not occur, the destaging process may not apply.

Another problem stems from back-end storage device reads and writes being physically distant from each other, leading to longer time intervals between operations due to physical limitations of storage devices, such as HDDs and/or SSDs. While intelligent ordering of input/output operations at the disk can improve this, there is still the fundamental problem that a storage device, such as an HDD or SSD, can only read/write in one place at a time and the system could be requesting it to be in two or more places, which may be separated both in terms of distance on a disk surface and in terms of seek time from one read or write to another.

According to the present disclosure, a disk location of a read I/O operation within a storage device can be used to influence where the destaging (asynchronous write) process for the storage device goes next. This can allow read I/O operations to take priority over write I/O operations in order to take advantage of the current disk location to minimize a distance/time from one I/O operation to the next. This can improve destaging efficiency and can result in a shorter seek time and distance during data write-out to back-end HDD/SSD from the cache.

Referring now to FIG. 1A, a block diagram illustrating components of a first non host-based data storage system 100 in accordance with embodiments of the present disclosure is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fiber Channel, SSA, ESCON, ATM, FICON, NVMe, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage devices 116a and 116b can include any combination of storage devices, such as all HDDs, all solid-state drives (SSDs), combinations thereof, and any other combination of suitable storage devices. Storage device bus 120 is any suitable storage bus or group of buses for transferring data directly between storage controller 108 and storage devices 116, including but not limited to SCSI, Fiber Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including HDDs, SSDs, optical drives, and tape drives, among others. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
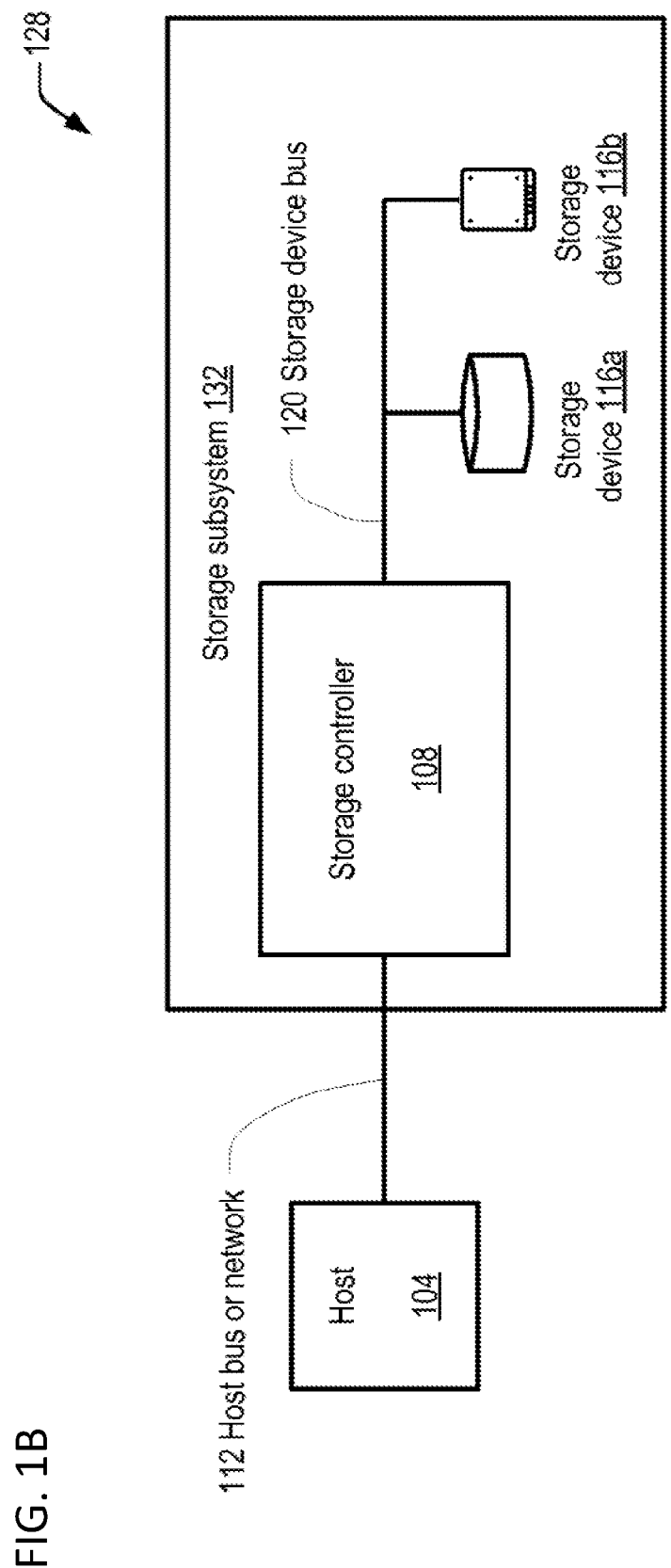
FIG. 1B is a block diagram illustrating components of a second non host-based data storage system in accordance with embodiments of the present disclosure.

Referring now to FIG. 1B, a block diagram illustrating components of a second non host-based data storage system 128 in accordance with embodiments of the present disclosure is shown. Non host-based data storage system 128 is similar to non host-based data storage system 100, with the exception being storage controller 108 is within storage subsystem 132, along with storage devices 116. In the embodiment illustrated in FIG. 1B, storage controller 108 is a single RAID controller 108. However, in other embodiments, storage controller 108 represents multiple RAID controllers 108.

Figure 1C:
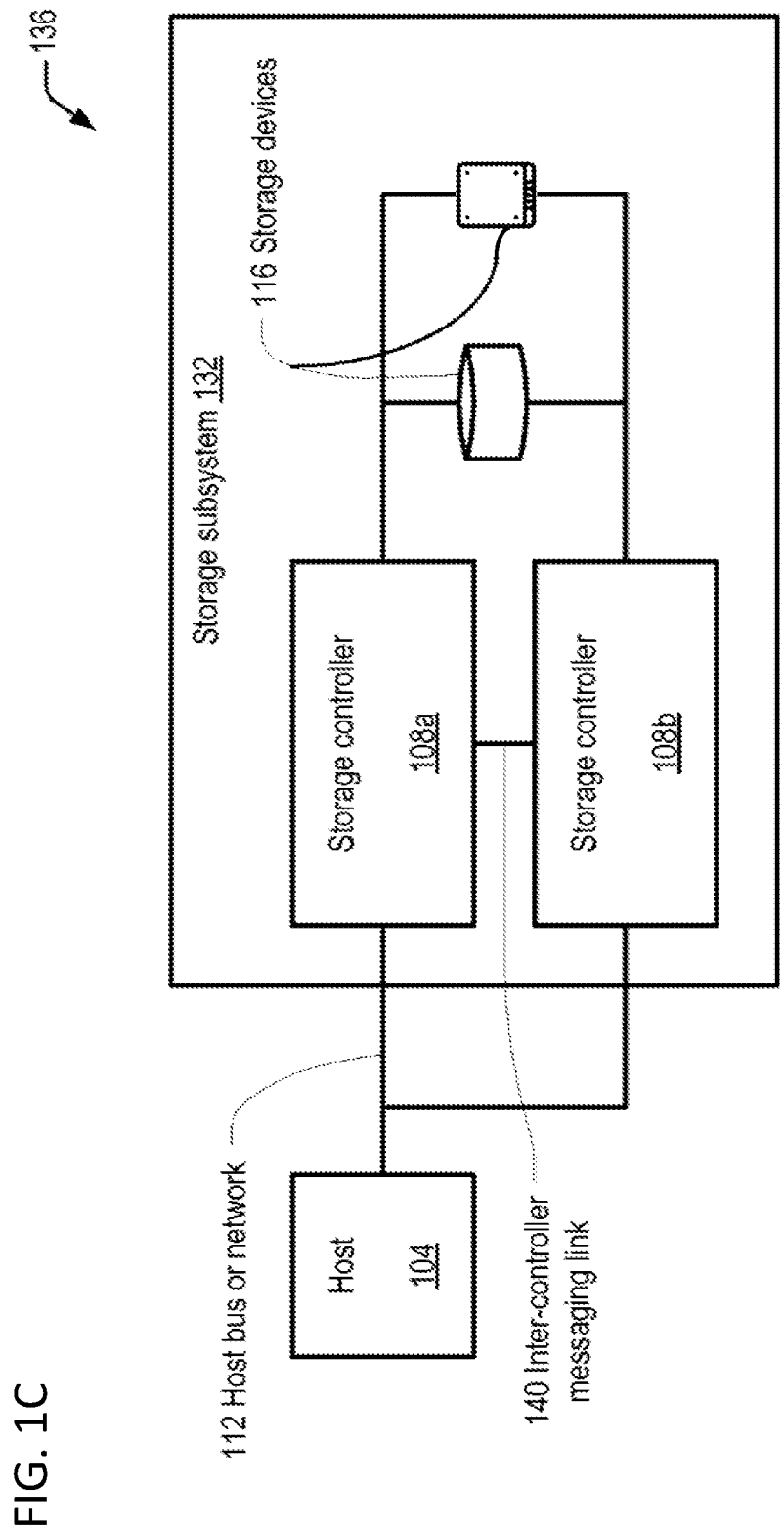
FIG. 1C is a block diagram illustrating components of a third non host-based data storage system in accordance with embodiments of the present disclosure.

Referring now to FIG. 1C, a block diagram illustrating components of a third host-based data storage system 136 in accordance with embodiments of the present disclosure is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. An inter-controller messaging link 140 can provide a communication and data path between storage controllers 108a, 108b in order to mirror write data and synchronize failover and failback operations.

Figure 2A:
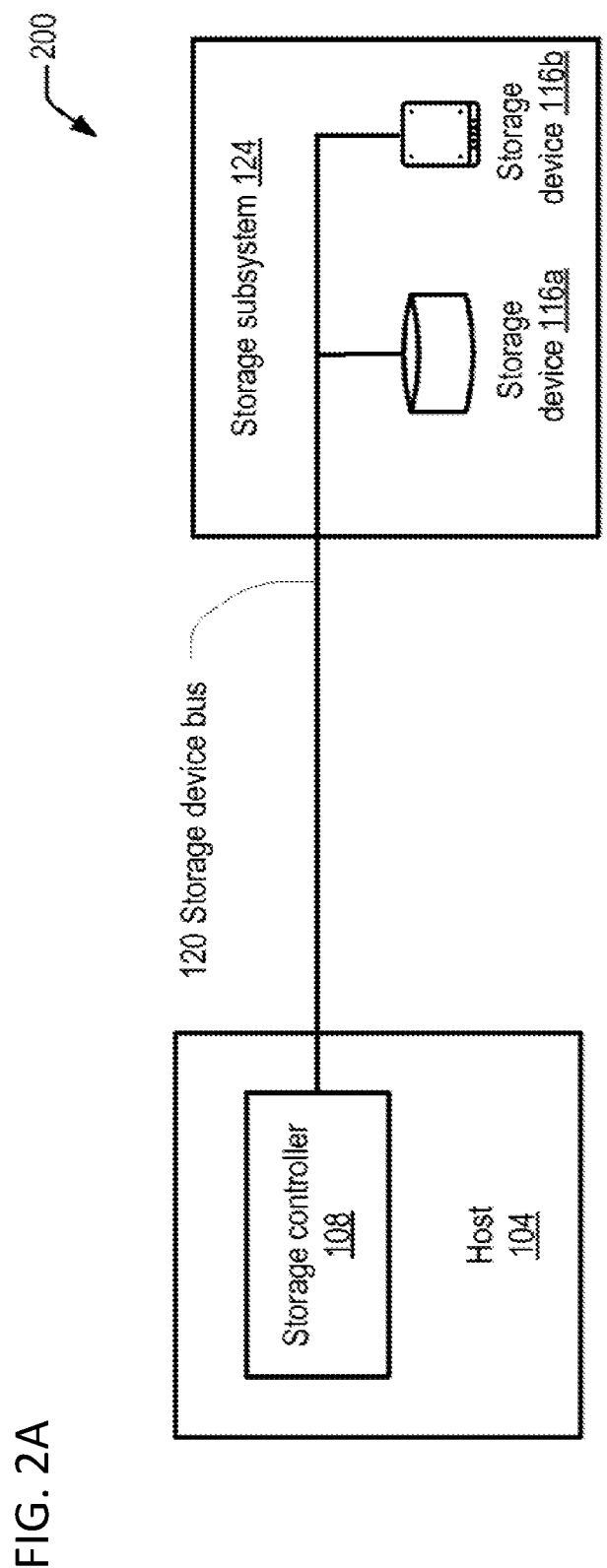
FIG. 2A is a block diagram illustrating components of a first host-based data storage system in accordance with embodiments of the present disclosure.

Referring now to FIG. 2A, a block diagram illustrating components of a first host-based data storage system 200 in accordance with embodiments of the present disclosure is shown. First host-based data storage system 200 is similar to first non host-based storage system 100 of FIG. 1A, except storage controller 108 is within host computer 104. Storage controller 108 interfaces through a local bus of host computer 104, where the local bus may be any suitable bus for high speed transfers between a central processing unit (CPU) of host computer 104 and storage controller 108, including Rapid IO, PCI, PCI-X, or PCI Express. Storage controller 108 may either be integrated on the motherboard of host computer 104, or may be an add-in board or other form of assembly in host computer 104.

Figure 2B:
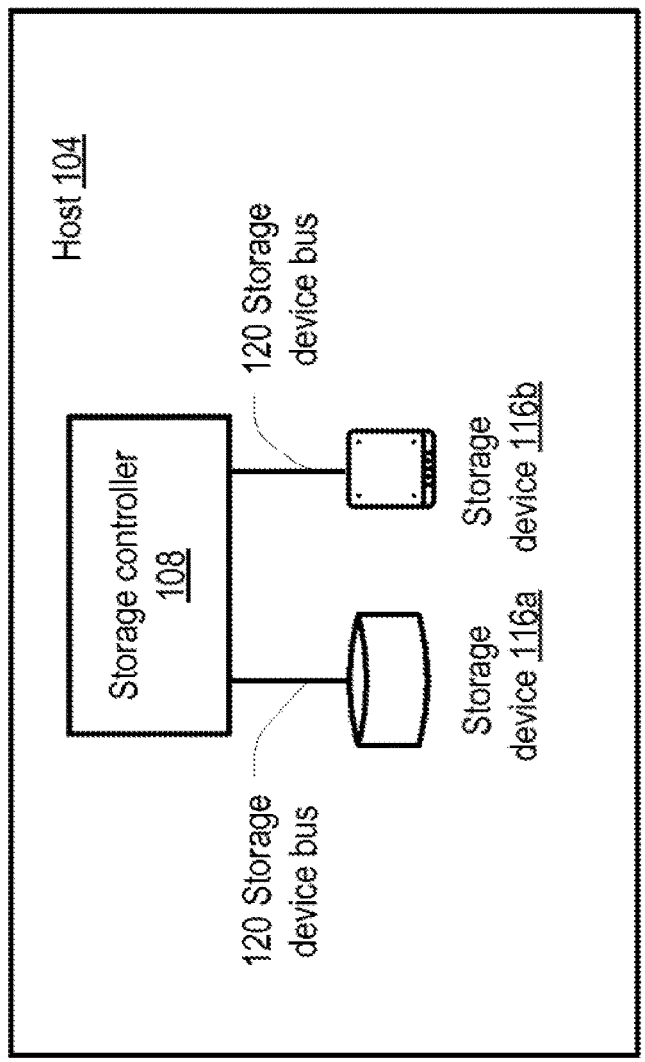
FIG. 2B is a block diagram illustrating components of a second host-based data storage system in accordance with embodiments of the present disclosure.

Referring now to FIG. 2B, a block diagram illustrating components of a second host-based data storage system 204 in accordance with embodiments of the present disclosure is shown. Second host-based data storage system 204 integrates the functions of storage subsystem 124 into host computer 104. Data storage system 204 represents a self-contained highly integrated data storage system.

Figure 2C:
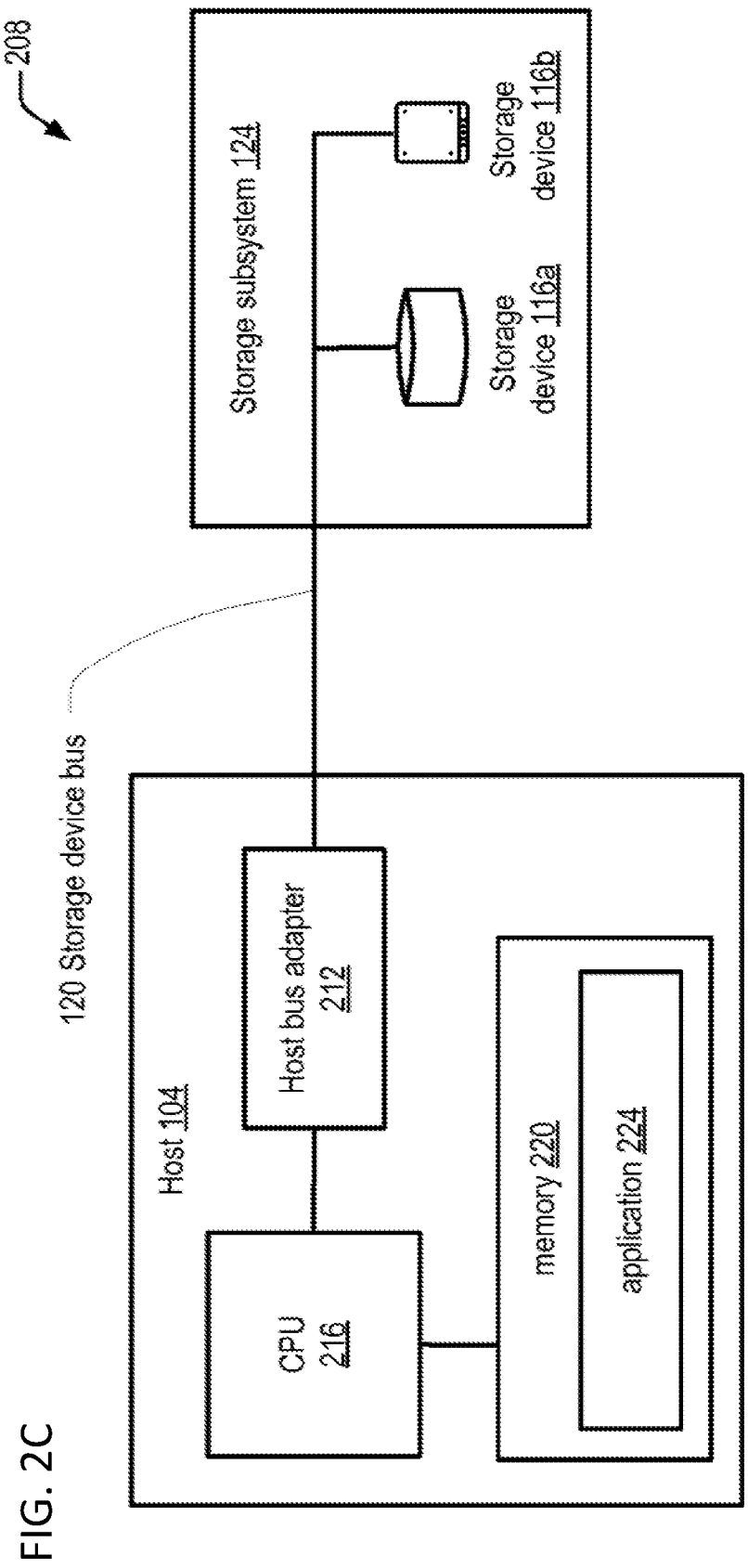
FIG. 2C is a block diagram illustrating components of a third host-based data storage system in accordance with embodiments of the present disclosure.

Referring now to FIG. 2C, a block diagram of illustrating components of a third host-based data storage system 208 in accordance with embodiments of the present disclosure is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a data storage system 300 in accordance with embodiments of the present disclosure is shown. Data storage system 300 includes one or more host computers 104 interconnected to a storage controller 108 through bus or network 112. Host computer 104 generates a host stream 308, which are multiple groups of sequential host I/O requests 332.

Storage controller 108 can include a central processing unit (CPU) or processor 312, which executes program instructions stored in a memory 316 coupled to the CPU 312. CPU 312 includes any processing device suitable for executing storage controller 108 programs, such as Intel x86-compatible processors, embedded processors, mobile processors, and/or RISC processors. CPU 312 may include several devices including field-programmable gate arrays (FPGAs), memory controllers, North Bridge devices, and/or South Bridge devices.

Memory 316 may be one or more forms of volatile memory 316, non-volatile memory 316, or a combination of both volatile and non-volatile memories 316. The memory 316 includes firmware which includes program instructions that CPU 312 fetches and executes, including program instructions for the processes of the present disclosure. Examples of non-volatile memory 316 include, but are not limited to, flash memory, SD, SSD, EPROM, EEPROM, hard disks, and NOVRAM. Volatile memory 316 stores various data structures and user data. Examples of volatile memory 316 include, but are not limited to, SRAM, DDR RAM, DDR2 RAM, DDR3 RAM, Z-RAM, TTRAM, A-RAM, ETA RAM, and other forms of temporary memory.

Memory 316 includes a read data cache 324 and a write data cache 328 or write cache, which provide improved read and write performance, respectively, to the host computer 104. Memory 316 also includes data stream metadata 320. Data stream metadata 320 stores parameters related to host I/O requests 332, and is used to control sequential I/O operations.

Storage controller 108 is coupled to storage subsystem 124, 132, which includes one or more virtual disks (also referred to as VDisks or VDs, herein) 348a-348n. Each virtual disk 348 is a different RAID volume, and includes one or more storage devices 116. Frequently accessed data is read from virtual disks 348 into the read data cache 324, where it can be provided in response to host read requests 332 much faster than directly from the virtual disks 348. Write data is initially stored in the write data cache 328, which is much faster than writes sent directly to virtual disks 348. The write data cache 328 is divided into a predetermined number of fixed-size cache elements 352, identified as CE 0 352a-CE n 352n. The storage controller 108 transfers storage device writes 344 from the write data cache 328, and more specifically from the cache elements 352, to the virtual disks 348.

In some embodiments, storage controller 108 includes one or more timers 340. Timers 340 may be hardware timers controlled by CPU 312, or it may be software routines that executes on CPU 312. Timers 340 measure host I/O request timeout periods 908, and is discussed in the following description and figures. Timers 340 may represent any number of timers, and in the present disclosure there is one timer 340 allocated globally to all host I/O requests 332.

It should be understood that storage controller 108 may be functionally organized in countless different functional organizations and architectures without diverting from the scope or operation of the present disclosure.

Referring now to FIG. 4A, a block diagram illustrating components of a single storage device striped volume 400, in accordance with embodiments of the present disclosure is shown.

A single storage device 116 may be a striped volume 400. Storage device 116 may be an HDD, optical drive, tape drive, SSD, or any other form of mass data storage device. A striped volume 400 is a logical volume comprising two or more evenly sized stripes. The portion of a stripe on one storage device 116 is a chunk.

FIG. 4A illustrates a striped volume 400 having four stripes: stripe N 404, stripe N+1 408, stripe N+2 412, and stripe N+3 416. Stripe N 404 has chunk A 420, stripe N+1 408 has chunk B 424, stripe N+2 412 has chunk C 428, and stripe N+3 416 has chunk D 432. Although FIG. 4A illustrates a single storage device striped volume 400 with four stripes 404, 408, 412, and 416 and four chunks 420, 424, 428, and 432, it should be understood that a single storage device striped volume 400 may have fewer than four stripes/chunks or more than four stripes/chunks. Additionally, a single storage device striped volume 400 may occupy only a portion of the available data storage space on a single storage device 116, and there may be other single storage device striped volumes 400 on the same storage device 116. When a virtual disk 348 is a single storage device 116, the virtual disk stripe size is the size of a chunk 420, 424, 428, or 432.

Referring now to FIG. 4B, a block diagram illustrating components of a multiple storage device striped volume 434 in accordance with embodiments of the present disclosure is shown.

Multiple storage devices 116, or a portion of multiple storage devices 116, may be a striped volume 434. FIG. 4B illustrates a striped volume 434 on three storage devices 116a, 116b, and 116c. Striped volume 434 has four stripes: stripe M 436, stripe M+1 440, stripe M+2 444, and stripe M+3 448. Stripe M 436 has chunks E 452, F 456, and G 460. Stripe M+1 440 has chunks H 464, 1468, and J 472. Stripe M+2 444 has chunks K 476, L 480, and M 484. Stripe M+3 448 has chunks N 488, 0 492, and P 496. Although FIG. 4B illustrates a multiple storage device striped volume 434 with four stripes 436, 440, 444, and 448 and three storage devices 116a, 116b, and 116c, it should be understood that a multiple storage device striped volume 434 may have fewer or more than four stripes or fewer or more than three storage devices 116. As used in the present disclosure, a "striped volume 400, 434" may be either a single storage device striped volume 400 or a multiple storage device striped volume 434. Additionally, a multiple storage device striped volume 434 may occupy only a portion of the available data storage space on a group of storage devices 116, and there may be other multiple storage device striped volumes 434 on the same group of storage devices 116. When a virtual disk 348 is multiple storage devices 116, the virtual disk stripe size is the combined size of the chunks in a stripe: either chunks 452+456+460, 464+468+472, 476+480+484, or 488+492+496 in the three-storage device 116 case of FIG. 4B.

Referring now to FIG. 5, a block diagram illustrating a write data cache 328 data flow in accordance with embodiments of the present disclosure is shown. Write data cache 328 is part of memory 316 of storage controller 108. Write data cache 328 receives host I/O write requests 332 from host computers 104 over host bus or network 112, and stores the write data in write data cache 328 as dirty data. Dirty data is write data from host I/O write requests 332 stored in the write data cache 328 that has not yet been written to storage devices 116. Host data writes are stored in the dirty portion of cache 508, awaiting conditions that will transfer storage device writes 344 from the dirty portion of cache 508 to striped volume 400, 434. Storage device writes 344 are either partial stripe writes or full stripe writes. The portion of the write data cache 328 that is not occupied by dirty data is the empty portion of the cache 504, and it is available to receive write data from the host I/O write requests 332.

A dirty watermark 512 can be maintained by the storage controller 108 to keep track of the amount of dirty data in the write data cache 328. As more dirty data 508 is accumulated in the write data cache 328, the dirty watermark 512 increases accordingly, and as dirty data 508 is destaged to storage devices 116, the dirty watermark 512 decreases accordingly. The write data cache 328 can also include a dirty watermark maximum percentage 516 or dirty watermark maximum value, which is a predetermined value that is compared to the dirty watermark 512 at specific times to determine if a cache element 352 should be destaged from the write data cache 328 to a virtual disk 348.

As host I/O write requests 332 are received and written into write data cache 328, the dirty portion of cache 508 expands accordingly, as long as sufficient space to store the new write data is present in the data write cache 328. At the same time the dirty portion of cache 508 expands, the empty portion of cache 504 contracts. Similarly, as storage device writes 344 transfer data from the write data cache 328 to the virtual disks 348, the dirty portion of cache 508 contracts and the empty portion of cache 504 expands accordingly.

Figure 6:
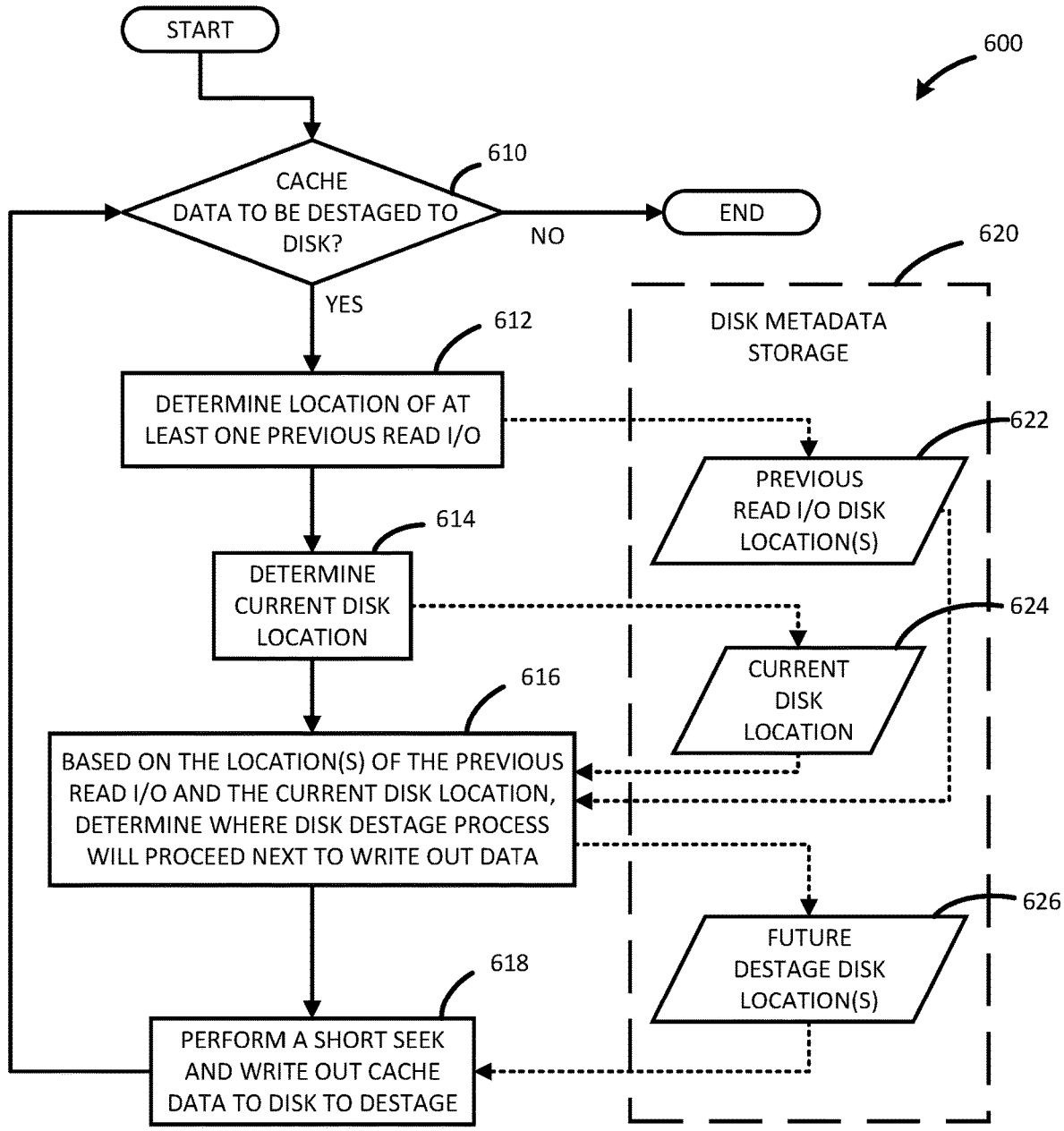
FIG. 6 shows a destaging process for localized cache destages, according to various embodiments.

Turning now to FIG. 6, a destaging process 600 for localized cache destaging is shown, according to various embodiments. Process 600 can be performed by a controller (e.g., controller 108), or other suitable computer-based hardware, according to various embodiments.

The process 600 can begin by determining whether there is cache data (e.g., cache blocks, etc.) to be destaged to disk (back-end storage device) at operation 610. As described, herein, cache data can be destaged to disk periodically (asynchronously) in order to free space within the cache in order to increase a probability of a cache hit in a future read request within a storage system. Upon a cache miss, data from the back-end storage device can be written to the cache in order to make the data readable during another cache read request in the future. Avoiding cache misses is generally preferable to reads from a back-end storage device, due to speed and performance.

If it is determined that there is currently cache data to be destaged to disk, a disk location of at least one previous disk read I/O can be determined at operation 612. Disk reads and writes can correspond to one or more cache blocks of an associated cache. A disk location can signify any form of sector or data block identification within one or more platters or portions of a storage device, such as an HDD or SSD. Disk locations, when more than one is determined, can also have a known or calculated distance between the two or more disk locations. Disk locations can be stored, read, and analyzed in terms of LBA metadata, which can also be used to store additional disk location and other data.

For example, two disk locations may be located on different magnetic disk platters of a single HDD platter stack, and may not require an actuator arm to move a great distance (or angle, measured in degrees) between the two locations. In another case, two disk locations may both be located on a single platter, but may require a more signification movement of the actuator arm (or other read/write head apparatus that is movable or configurable. In the former case, the two disk locations may be considered distant by some metrics, but close by others, e.g., how long does it take to move a read/write head from the first disk location to the second disk location. In the latter case, the two disk locations may be physically proximate to each other, but may require more time for a read/write head to travel from one disk location to the second. Either based on operation 612 or otherwise, a disk metadata storage 620 can be caused to include and store one or more previous disk read I/O disk location(s) at 622. According to various embodiments, the previous disk read I/O location(s) can include the various disk location, other disk locations nearby the disk locations, the time previously spent between disk locations (and reads), or any other relevant data to disk locations in the past.

Following operation 612, a current disk location can be determined at operation 614. In addition to the determination of the current disk location at operation 814, other data and parameters can also be determined. Either based on operation 614 or otherwise, the disk metadata storage 620 can be caused to include and store a current disk location at 624, as well as optionally any other locations or data determined or predicted at operation 614.

Following operation 614, and based on the location(s) of the previous read I/O and the current disk location, it can be determined (e.g., received from a controller) at operation 616 where the disk destage process will proceed next to write out data to the disk. Operation 616 can utilize previous I/O disk location(s) 622 and/or current disk location 624 by communicating and reading data stored within the disk metadata storage 620. Future destage disk location(s) 626 can then be generated and stored within disk metadata storage 620 based on operation 616. Future destage disk location(s) can include, for example, predicted and probabilistically likely disk locations where a destaging operation will proceed next or in the near or more distant future. For example, predicated disk locations can rely at least partially on past data, e.g., for similar operations, similar users, etc. Any number of future destage disk locations can be stored in this way.

Following operation 616, a drive "short" seek can be performed by the drive based at least in part on the future destage disk location(s) 626 generated at operation 616, and cache data can then be written out to disk to complete the destaging process 600. The process can then optionally repeat, for example, if it is again determined that additional cache data is to be destaged to disk at operation 610. If no additional cache data is to be destaged to disk at operation 610, the process may end.

Figure 7:
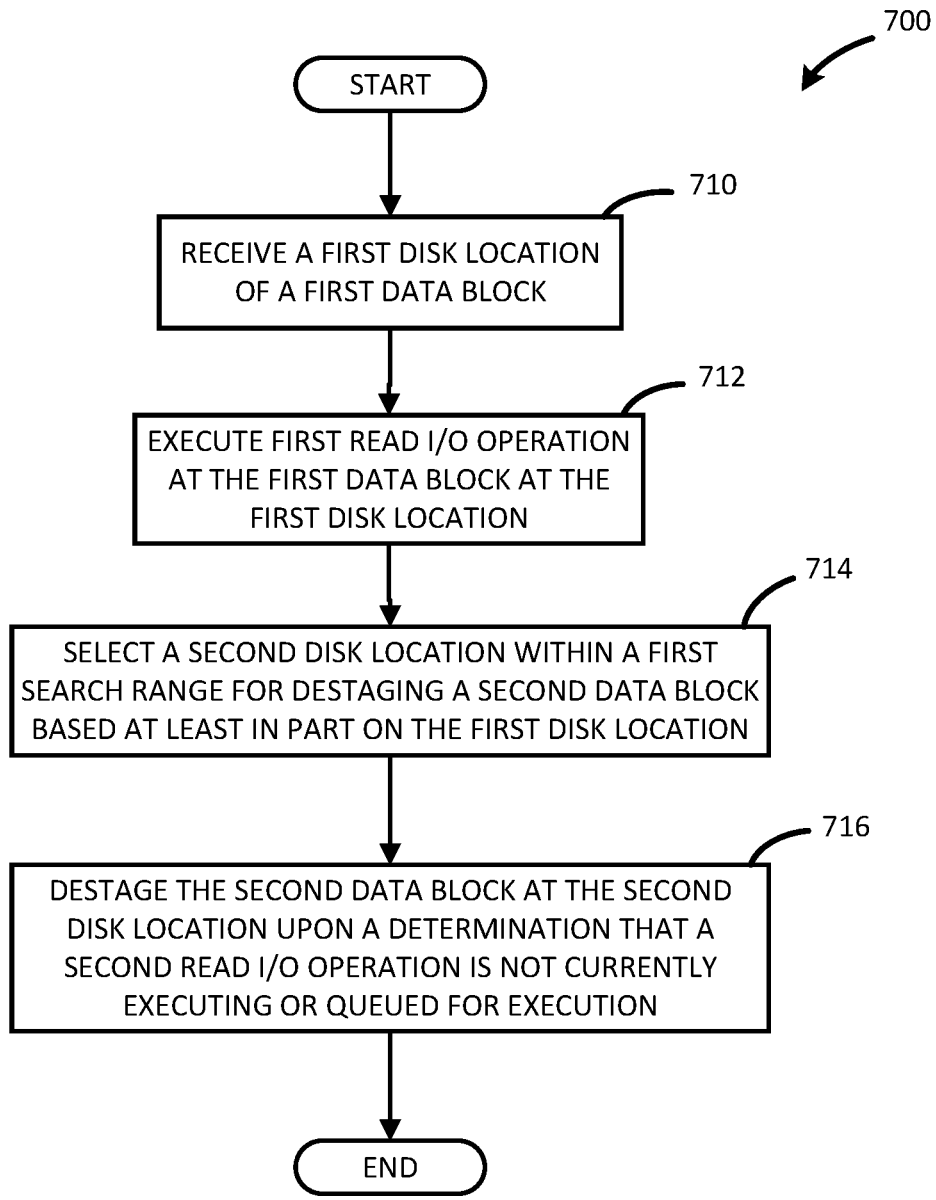
FIG. 7 is another destaging process for localized cache destaging, according to various embodiments.

FIG. 7 is a destaging process 700 for localized cache destaging, according to various embodiments.

Process 700 may begin by receiving a first disk location of a first data block at operation 710. The first disk location may correspond to a physical disk or a LBA, raw LBA, or other data structure. At operation 712, a first read I/O operation can be executed at the first data block at the first disk location. Following operation 712, a second disk location can be selected at operation 714, the second disk location being within a first search range for destaging a second data block based at least in part on the first disk location. At operation 716, the second data block can be destages at the second disk location upon a determination that a second read I/O operation is not currently executing or queued for execution. The process may then end or repeat, according to various embodiments.

Figure 8:
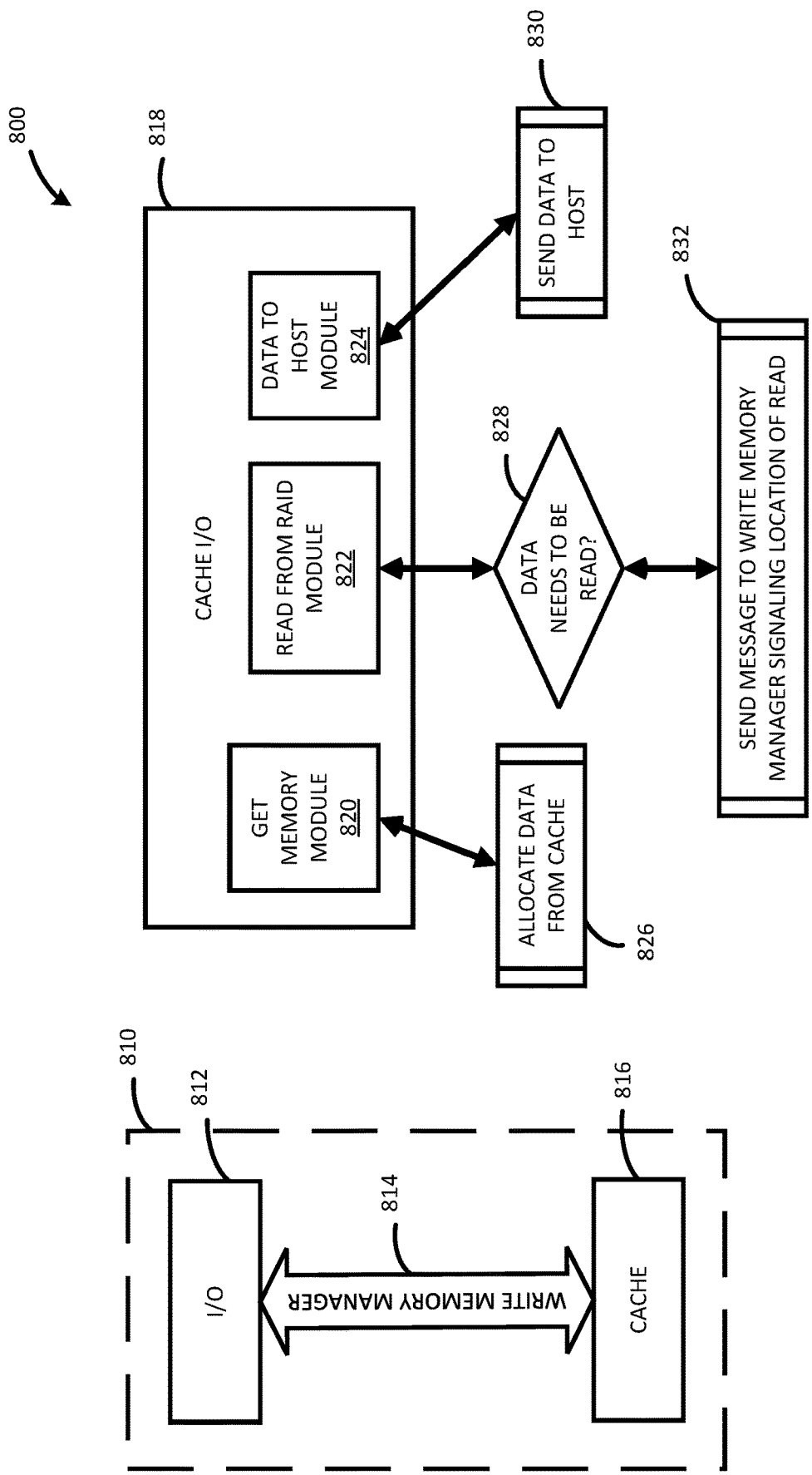
FIG. 8 is a cache I/O schematic for use in localized destaging, according to various embodiments.

FIG. 8 is a cache I/O schematic 800 for use in localized destaging, according to various embodiments.

As an overview of a process according to schematic 800, a process can first allocate, read, or transmit data with respect to a cache. Next, it can be determined if the data needs to be read, and if so, to transmit a signal with a location of the read. If the data does not need to be read, the read operation would have experienced a cache hit, and the process would end. If the data does need to be read, the data to be read would be transmitted to a host for further action. Next, the process can determine if there is any data to be destaged. If yes, an LBA and volume can be converted into a raw container LBA. Next, a search range can be defined based on the raw container LBA, and a size, location, stripe boundaries, etc. of a related interval tree.

According to various embodiments, data that is written to the controller it is stored in the Write Memory Manager (WMM) 814. Data can be stored in an interval tree to allow for range searches, and data can be stored either in a raw container LBA or a container LBA. Using an interval tree can allow storing various data within ranges in order to efficiently and simply compute results of a search within the interval tree. Ranges for each interval tree or portion thereof can be generated dynamically (on-the-fly), and can start as a large group of LBA blocks (dirty block) that are written and classified by location and/or length. For example, a data block at LBA 100 having a length of 10 can be classified within the interval tree.

Portions of LBA data formats or filesystem constructs can include containers, raw containers, among other arrangements of stored data. According to various embodiments, a raw container (e.g., including a capacity of 90 GB of data) can include more than one (e.g., 3) containers (e.g., each including a capacity of 30 GB of data), in order to compose a raw container through the combination of the several containers. A raw container can include a virtual disk (Vdisk), RAID 1 data, a configured set of disks, etc.

According to one embodiment, an I/O operation 812 can be transmitted to a cache 816. When the I/O operation 812 has be transmitted to the cache 816, the cache 816 can create a cache I/O operation 818, which can include various modules (e.g., actors), such as a get memory (GM) module 820, a read from raid (RFR) module 822, and a data to host (DTH) module 824.

According to various embodiment, the GM module 820 can be executed in order to allocate data from the cache 816. The RFR module 822 can also be executed, and if the data needs to be read in the RFR module 822 can transmit a message to the WMM 814 signaling a location of a read, where The WMM 814 receives an input including LBA and Volume. As discussed herein, if there is a cache hit and a RFR module 822 is not utilized, then this process does not happen. After the data is read from disk the DTH module 824 sends the data to the host at operation 830. The process may then end.

In order for the WMM to read a location signal, the WMM 814 can determine if it should presently be destaging any cache data. Based on the amount of cache available and the number of outstanding destages as well as other available metrics, the WMM 814 can take the LBA and volume and convert it into a raw container LBA (rLBA). Next, a search range can be defined as follows: start of search range=rLBA−searchRange/2, end of search range=rLBA+searchRange/2. Therefore, the searchRange=size in LBAs to determine where a seek of this distance is found to be relatively fast. This can be defined by looking at the random I/O performance on a drive vs percent of drive used. For instance, in some embodiments this might be an iterative search with a progressively larger search range to try to find the closest data to the rLBA. For example, the iterative search can be aided by various stats that would indicated if more searching should be done.

Figure 9:
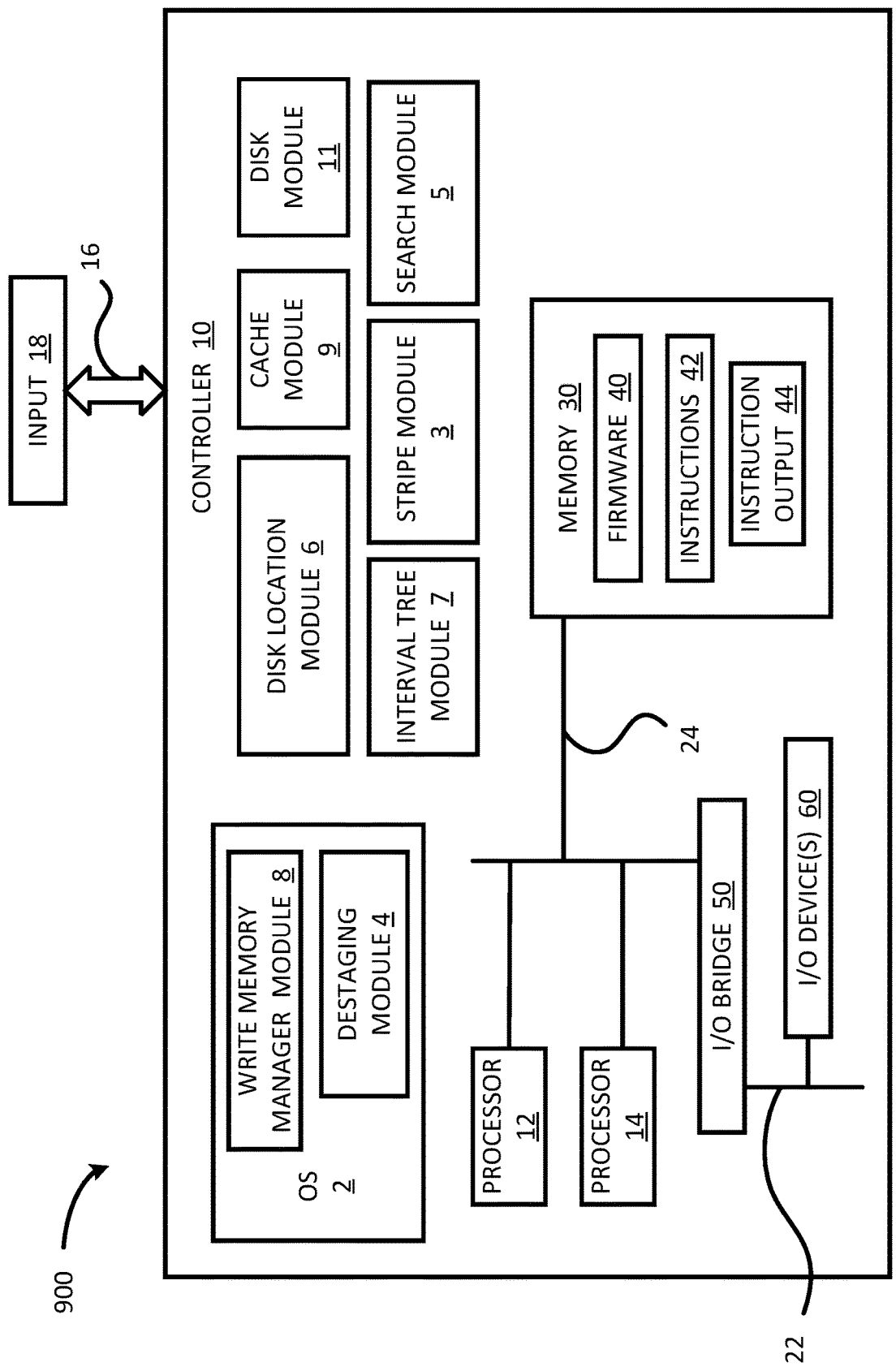
FIG. 9 is a block schematic diagram of a computer system, according to embodiments of the present disclosure.

The search range is also preferably aligned to stripe boundaries (in embodiments using various RAID formats). In some preferable embodiment, the WMM 814 uses an interval tree to enable this function. The data that is closest to the rLBA would then be chosen and a destage process would be created around that location and issued to the lower layers of the interval tree. With any cache element that is found within the search range the current destage optimization process will be followed to determine if the cache element should be destaged or if there is a better candidate nearby. This includes, for example, destage streams, full stripe affinity and any other suitable optimizations. Once a cache element is chosen the next write pointer can be set according to the current policies FIG. 9 is a block schematic diagram of a computer system 900 according to embodiments of the present disclosure.

Computer system 900, as shown, is configured with an interface 16 to enable a controller 10 to receive a request to efficiently destaging sequential write data. The controller 10 may be in communication with one or more cache through a cache module 9, and one or more hard-disk drive (or other storage device) through disk module 11, according to various embodiments. A write memory manager module 8 and a destaging module stored may be configured to control destaging activities. The controller 10 may also facilitate implementation and performance of various other methods, as described herein. The controller 10 may include various computing components, including a central processing unit in processors 12, 14, memory 30, storage components, and be include an operating system 2 and/or firmware installed thereon. The various components of the controller 10 may be operatively or electrically connected to one another, and input/output device may be configured to interface with the controller 10 as described in more detail, below.

An input 18 may be received at interface 16. In embodiments, the interface 16 can enable controller 10 to receive, or otherwise access, the input 18 via, for example, a network (e.g., an intranet, or a public network such as the Internet), or a storage medium, such as a hard-disk drive internal or connected to controller 10. The interface 16 can be configured for human input or other input devices 60, such as described later in regard to components of controller 10. It would be apparent to one of skill in the art that the interface can be any of a variety of interface types or mechanisms suitable for a computer, or a program operating in a computer, to receive or otherwise access or receive a source input or file.

Processors 12, 14 included in controller 10 are connected by a memory interface 24 to memory device or module 30. In embodiments, the memory 30 can be a cache memory, a main memory, a flash memory, or a combination of these or other varieties of electronic devices capable of storing information and, optionally, making the information, or locations storing the information within the memory 30, accessible to one or more processor 12, 14. Memory 30 can be formed of a single electronic (or, in some embodiments, other technologies such as optical) module or can be formed of a plurality of memory devices. Memory 30, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 900 can include a plurality of memory devices. A memory interface, such as 24, between a one or more processors 12, 14 and one or more memory devices can be, for example, a memory bus common to one or more processors and one or more memory devices. In some embodiments, a memory interface, such as 24, between a processor (e.g., 12, 14) and a memory 30 can be point to point connection between the processor and the memory, and each processor in the computer 900 can have a point-to-point connection to each of one or more of the memory devices. In other embodiments, a processor (e.g., 12) can be connected to a memory (e.g., memory 30) by means of a connection (not shown) to another processor (e.g., 14) connected to the memory (e.g., 24 from processor 12 to memory 30).

Computer 900 can include an input/output (I/O) bridge 50, which can be connected to a memory interface 24, or to processors 12, 14. An I/O bridge 50 can interface the processors 12, 14 and/or memory devices 30 of the computer 900 (or, other I/O devices) to I/O devices 60 connected to the bridge 50. For example, controller 10 includes I/O bridge 50 interfacing memory interface 24 to I/O devices, such as I/O device 60. In some embodiments, an I/O bridge 50 can connect directly to a processor or a memory, or can be a component included in a processor or a memory. An I/O bridge 50 can be, for example, a peripheral component interconnect express (PCI-Express) or other I/O bus bridge, or can be an I/O adapter.

An I/O bridge 50 can connect to I/O devices 60 through an I/O interface, or I/O bus, such as I/O bus 22 of controller 10. For example, I/O bus 22 can be a PCI-Express or other I/O bus. I/O devices 60 can be any of a variety of peripheral I/O devices or I/O adapters connecting to peripheral I/O devices. For example, I/O device 60 can be a graphics card, keyboard or other input device, a hard-disk drive, solid-state drive (SSD) or other storage device, a network interface card (MC), etc. I/O devices 60 can include an I/O adapter, such as a PCI-Express adapter, that connects components (e.g., processors or memory devices) of the computer 900 to various I/O devices 60 (e.g., disk drives, Ethernet networks, video displays, keyboards, mice, styli, touchscreens, etc.).

Computer 900 can include instructions 42 executable by one or more of the processors 12, 14 (or, processing elements, such as threads of a processor). The instructions 42 can be a component of one or more programs. The programs, or the instructions 42, can be stored in, and/or utilize, one or more memory devices of computer 900. Memory 30 can also store one or more instruction output 44. As illustrated in the example of FIG. 9, controller 10 includes a plurality of programs or modules, such as disk location module 6, cache module 9, disk module 11, interval tree module 7, stripe module 3, and search module 5. A program can be, for example, an application program, an operating system (OS) or a function of an OS, or a utility or built-in function of the computer 900. A program can be a hypervisor, and the hypervisor can, for example, manage sharing resources of the computer 900 (e.g., a processor or regions of a memory, or access to an I/O device) among a plurality of programs or OSes.

Programs can be "stand-alone" programs that execute on processors and use memory within the computer 900 directly, without needing another program to control their execution or their use of resources of the computer 900. For example, controller 10 includes (optionally) stand-alone programs in disk location module 6, cache module 9, disk module 11, interval tree module 7, stripe module 3, and search module 5. A stand-alone program can perform particular functions within the computer 900, such as controlling, or interfacing (e.g., access by other programs) an I/O interface or I/O device. A stand-alone program can, for example, manage the operation, or access to, a memory (e.g., memory 30). A basic I/O subsystem (BIOS), or a computer boot program (e.g., a program that can load and initiate execution of other programs) can be a standalone program.

Controller 10 within computer 900 can include one or more OS 2, and an OS 2 can control the execution of other programs such as, for example, to start or stop a program, or to manage resources of the computer 900 used by a program. For example, controller 10 includes OS 2, which can include, or manage execution of, one or more programs, such as OS 2 including (or, managing) write memory manager module 8 and/or destaging module 4. In some embodiments, an OS 2 can function as a hypervisor.

A program can be embodied as firmware (e.g., BIOS in a desktop computer, or a hypervisor) and the firmware can execute on one or more processors and, optionally, can use memory, included in the computer 900. Firmware can be stored in a memory (e.g., a flash memory) of the computer 900. For example, controller 10 includes firmware 40 stored in memory 30. In other embodiments, firmware can be embodied as instructions (e.g., comprising a computer program product) on a storage medium (e.g., a CD-ROM, DVD-ROM, flash memory, or hard-disk drive), and the computer 900 can access the instructions from the storage medium.

In embodiments of the present disclosure, the computer 900 can include instructions for efficiently performing localized destages. Controller 10 includes, for example, disk location module 6, cache module 9, disk module 11, interval tree module 7, stripe module 3, and search module 5, which can operate, in conjunction with write memory manager 8 and/or destaging module 4 to efficiently destage data to disk. The computer 900 can utilize disk location module 6, cache module 9, disk module 11, interval tree module 7, stripe module 3, and search module 5 in a memory 30 of the computer 900, such as controller 10 storing the various cache and disk data, and perform localized destaging operations in memory 30.

The example computer system 900 and controller 10 are not intended to limiting to embodiments. In embodiments, computer system 900 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, the controller 10 can be, for example, a computing device having a processor (e.g., 12) capable of executing computing instructions and, optionally, a memory 30 in communication with the processor. For example, controller 10 can be a desktop or laptop computer; a tablet computer, mobile computing device, personal digital assistant (PDA), or cellular phone; or, a server computer, a high-performance computer (HPC), or a super computer. Controller 10 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

The present disclosure has now been described with reference to several embodiments thereof. The detailed description and examples have been given for clarity of understanding only. No unnecessary limitations are to be understood therefrom. It will be apparent to those skilled in the art that many changes can be made in the embodiments described without departing from the scope of the disclosure. The implementations described above and other implementations are within the scope of the following claims.

What is claimed is:

1. A system, comprising:
   a memory; and
   a processor coupled to the memory, wherein the processor is configured to perform operations comprising:
   receiving, in response to a first read input/output operation, a first location of a first data block, wherein the first location is stored in an interval tree,
   executing the first read input/output operation at the first data block according to the first location,
   selecting a second location within a first search range for destaging a second data block based at least in part on the first location, and
   destaging the second data block according to the second location upon a determination that a second read input/output operation is not currently executing or queued for execution.

2. The system of claim 1, wherein the operation of selecting the second location within the first search range uses a selection function that weights a seek distance of the first location to the second location.

3. The system of claim 1, further comprising the operations of:
   receiving, in response to a third read input/output operation, a third location of a third data block, and
   executing the third read input/output operation at the third data block according to the third location.

4. The system of claim 3, further comprising the operations of:
   selecting a fourth location within a second search range for destaging a fourth data block based at least in part on the third location, and
   destaging the fourth data block according to the fourth location upon a determination that a fourth read input/output operation is not currently executing or queued for execution.

5. The system of claim 1, wherein the first and second locations correspond to physical locations on a surface of a hard-disk drive recording medium.

6. The system of claim 1, wherein the interval tree comprises the first search range, and wherein the interval tree is configured to permit computing results of a search for data within data ranges of the interval tree, including at least the first search range.

7. The system of claim 6, wherein the selecting the second location for destaging the second data block based at least in part on the first location utilizes the interval tree to determine a range that separates the first and second locations.

8. The system of claim 7, wherein the second location is selected after the first search range is defined as the first location minus half the first search range to the first location plus half the first search range.

9. The system of claim 8, wherein the first search range is defined by stripe boundaries.

10. The system of claim 6, wherein the data ranges of the interval tree are generated dynamically by:
    receiving a group of data blocks,
    writing the data blocks, and
    classifying the data blocks according to location and length.

11. A method for performing localized destages, comprising:
    receiving, in response to a first read input/output operation, a first location of a first data block, wherein the first location is stored in an interval tree;
    executing the first read input/output operation at the first data block according to the first location;
    selecting a second location within a first search range for destaging a second data block based at least in part on the first location; and
    destaging the second data block according to the second location upon a determination that a second read input/output operation is not currently executing or queued for execution.

12. The method of claim 11, wherein the selecting the second location within the first search range weights a seek distance of the first location to the second location.

13. The method of claim 11, further comprising the operations of:
    receiving, in response to a third read input/output operation, a third location of a third data block, and
    executing the third read input/output operation at the third data block according to the third location.

14. The method of claim 13, further comprising the operations of:
    selecting a fourth location within a second search range for destaging a fourth data block based at least in part on the third location, and
    destaging the fourth data block according to the fourth location upon a determination that a fourth read input/output operation is not currently executing or queued for execution.

15. The method of claim 11, wherein the interval tree comprises the first search range, wherein the interval tree is configured to permit computing results of a search for data within data ranges of the interval tree, including at least the first search range, and wherein the selecting the second location for destaging the second data block based at least in part on the first location utilizes the interval tree to determine a range that separates the first and second locations.

16. The method of claim 11, wherein the second location is selected after the first search range is defined as the first location minus half the first search range to the first location plus half the first search range.

17. A computer program product for performing localized destages, the computer program product comprising a computer-readable storage medium having program code embodied therewith, the program code comprising computer-readable program code configured to perform a method, comprising:

receiving, in response to a first read input/output operation, a first disk location of a first data block on a first hard-disk drive, wherein the first disk location is stored in an interval tree;

executing the first read input/output operation at the first data block according to the first disk location;

selecting a second disk location within a first search range for destaging a second data block based at least in part on the first disk location; and destaging the second data block according to the second disk location upon a determination that a second read input/output operation is not currently executing or queued for execution.

18. The computer program product of claim 17, wherein the computer-readable program further causes the computing device to perform the operations of:

receiving, in response to a third read input/output operation, a third disk location of a third data block, and executing the third read input/output operation at the third data block according to the third disk location.

19. The computer program product of claim 18, wherein the computer-readable program further causes the computing device to perform the operations of:

selecting a fourth disk location within a second search range for destaging a fourth data block based at least in part on the third disk location, and destaging the fourth data block according to the fourth disk location upon a determination that a fourth read input/output operation is not currently executing or queued for execution.

20. The computer program product of claim 17, wherein the interval tree comprises the first search range, wherein the interval tree is configured to permit computing results of a search for data within data ranges of the interval tree, including at least the first search range, and wherein the selecting the second disk location for destaging the second data block based at least in part on the first disk location utilizes the interval tree to determine a range that separates the first and second disk locations.

* * * * *